(12) United States Patent
Li

(10) Patent No.: US 9,787,116 B2
(45) Date of Patent: Oct. 10, 2017

(54) CHARGING CIRCUIT, CONTROL CHIP AND CONTROL METHOD THEREOF

(71) Applicant: NUVOTON TECHNOLOGY CORPORATION, Hsinchu (TW)

(72) Inventor: Cheng-Tao Li, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 140 days.

(21) Appl. No.: 14/660,557

(22) Filed: Mar. 17, 2015

(65) Prior Publication Data
US 2016/0064981 A1 Mar. 3, 2016

(30) Foreign Application Priority Data
Aug. 28, 2014 (TW) .............................. 103129645 A

(51) Int. Cl.
*H02J 7/00* (2006.01)
*H02J 7/04* (2006.01)

(52) U.S. Cl.
CPC .......... *H02J 7/0052* (2013.01); *H02J 7/0029* (2013.01); *H02J 7/045* (2013.01); *H02J 7/0054* (2013.01); *H02J 2007/0037* (2013.01); *H02J 2007/0059* (2013.01)

(58) Field of Classification Search
CPC ........ H02J 7/0052; H02J 7/06; H02J 2007/10; H02J 7/025; H02J 7/042; H02J 2007/0037; H02J 2007/0039; Y02E 60/12; H02M 3/33561; H02M 3/33569; H02M 3/33507
See application file for complete search history.

(56) References Cited

U.S. PATENT DOCUMENTS

| | | | | |
|---|---|---|---|---|
| 5,060,131 A | * | 10/1991 | Sikora ............... | H02M 3/33507 363/21.09 |
| 5,717,578 A | * | 2/1998 | Afzal ................ | H02M 3/33507 320/111 |
| 7,292,005 B2 | | 11/2007 | Pietkiewicz et al. | |
| 2009/0303752 A1 | * | 12/2009 | Kada ................. | H02M 3/33507 363/19 |
| 2013/0241509 A1 | * | 9/2013 | Chung ..................... | G05F 1/46 323/282 |

FOREIGN PATENT DOCUMENTS

| | | |
|---|---|---|
| TW | I376986 | 11/2012 |
| TW | 201301726 A | 1/2013 |
| TW | 201340573 A | 10/2013 |
| TW | 201414146 A | 4/2014 |
| TW | 201421876 A | 6/2014 |

OTHER PUBLICATIONS

Taiwanese Search Report dated Aug. 6, 2015, as issued in corresponding Taiwan Patent Application No. 103129645 (1 page).

\* cited by examiner

*Primary Examiner* — Julian Huffman
*Assistant Examiner* — Michael Konczal
(74) *Attorney, Agent, or Firm* — Muncy, Geissler, Olds & Lowe, P.C.

(57) ABSTRACT

A charging circuit including a transformer, a storage element, a switch element, a first resistor, and a current detection unit is provided. The transformer includes a primary coil and a secondary coil. The storage element is coupled to the secondary coil. The switch element is coupled to the primary coil. The first resistor is coupled to the primary coil. The current detection unit detects current flowing through the first resistor. When the current reaches a set current, the current detection unit sends a full signal to de-activate the switch unit.

11 Claims, 4 Drawing Sheets

CHARGING CIRCUIT, CONTROL CHIP AND CONTROL METHOD THEREOF

CROSS REFERENCE TO RELATED APPLICATIONS

This application claims priority of Taiwan Patent Application No. 103129645, filed on Aug. 28, 2014, the entirety of which is incorporated by reference herein.

BACKGROUND OF THE INVENTION

Field of the Invention

The present disclosure relates to a charging circuit, and more particularly to a charging circuit comprising a transformer.

Description of the Related Art

With technological development, the functions and types of electronic devices have increased. Generally, electronic devices require various electronic elements. Each element needs a different operation voltage. Therefore, a charging circuit is required to provide an appropriate operation voltage to the electronic elements.

BRIEF SUMMARY OF THE INVENTION

In accordance with an embodiment, a charging circuit comprises a transformer, a storage element, a switch element, a first resistor, and a current detection unit. The transformer comprises a primary coil and a secondary coil. The storage element is coupled to the secondary coil. The switch element is coupled to the primary coil. The first resistor is coupled to the primary coil. The current detection unit detects a current flowing through the first resistor. When the current reaches a set current, the current detection unit sends a full signal to de-activate the switch unit.

In accordance with another embodiment, a control chip comprises a full pin, a first power pin, a second power pin, and a charging circuit. The full pin provides a full signal. The first power pin receives a first operation voltage. The second power pin receives a second operation voltage. The charging circuit operates according to the first and second operation voltages and comprises a transformer, a storage element, a switch element, a first resistor, and a current detection unit. The transformer comprises a primary coil and a secondary coil. The storage element is coupled to the secondary coil. The switch element is coupled to the primary coil. The first resistor is coupled to the primary coil. The current detection unit detects a current flowing through the first resistor. When the current reaches a set current, the current detection unit sends the full signal and de-activates the switch unit.

In accordance with a further embodiment, the present disclosure provides a control method. In the control method, a transformer is utilized to charge a storage element, and a switch unit is coupled to a primary coil of the transformer. A current flowing through the primary coil is further detected, and when the current flowing through the primary coil reaches a set current, the switch unit is de-activated.

A detailed description is given in the following embodiments with reference to the accompanying drawings.

BRIEF DESCRIPTION OF THE DRAWINGS

The present disclosure can be more fully understood by referring to the following detailed description and examples with references made to the accompanying drawings, wherein.

DETAILED DESCRIPTION OF THE INVENTION

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

Figure 1:
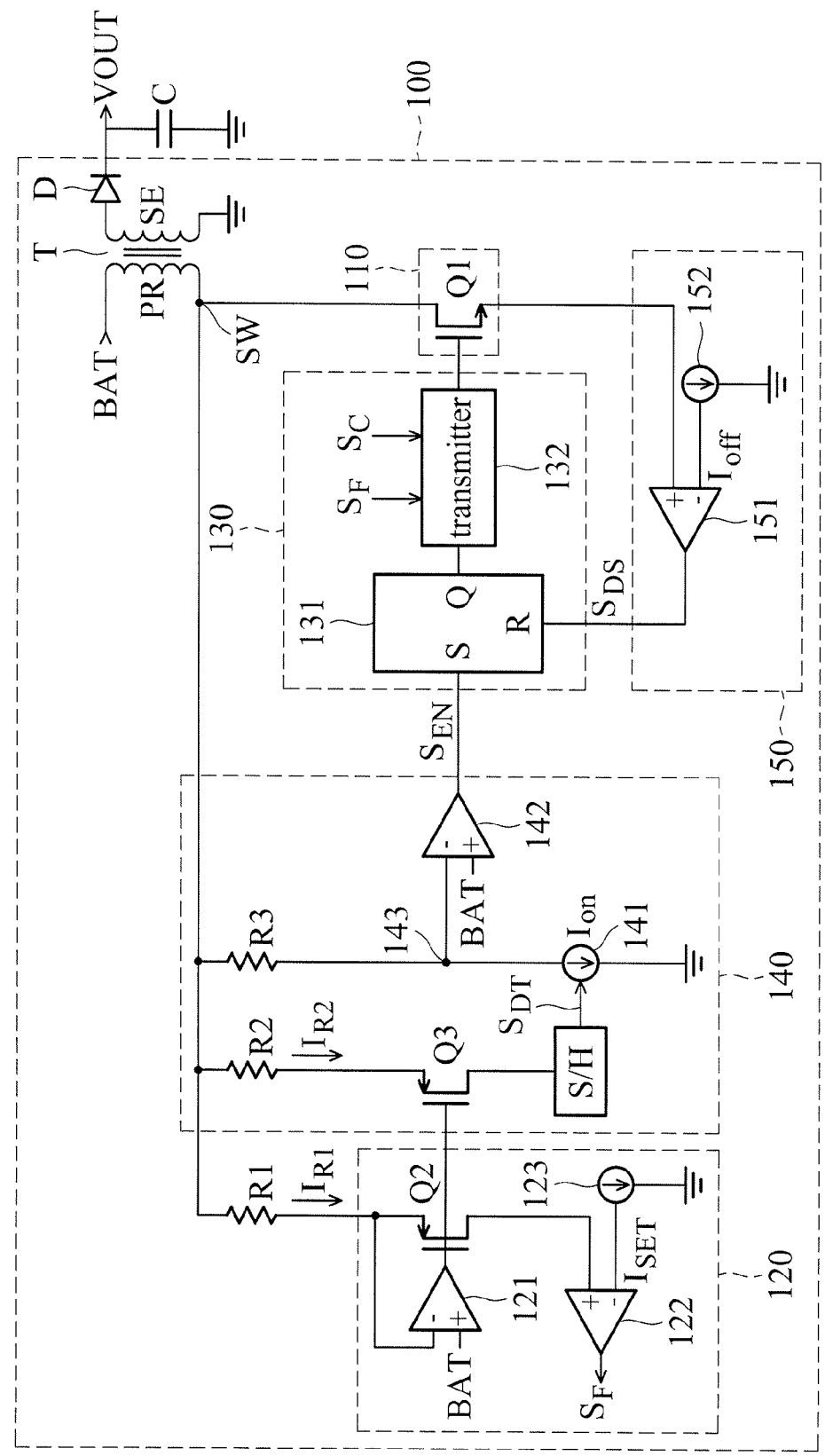
FIG. 1 is a schematic diagram of an exemplary embodiment of a charging circuit, in accordance with an embodiment of the present disclosure.

FIG. 1 is a schematic diagram of an exemplary embodiment of a charging circuit, in accordance with an embodiment of the present disclosure. The charging circuit 100 comprises a transformer T, a storage element C, a switch unit 110, a resistor R1 and a current detection unit 120. In this embodiment, the charging circuit 100 receives a battery voltage BAT to charge the storage element C, and generates an output voltage $V_{OUT}$. In one embodiment, the charging circuit 100 is capable of serving a charging circuit for a strobe. In this case, the storage element C provides the output voltage $V_{OUT}$ to a strobe (not shown in FIGs).

The transformer T comprises a primary coil PR and a secondary coil SE. The storage element C is coupled to the secondary coil SE to store energy. In this embodiment, a diode D is coupled between the storage element C and the transformer T to avoid leakage of electricity. The switch unit 110 is coupled to the primary coil PR. When the switch unit 110 is activated, the transformer T charges the storage element C according to the battery voltage BAT. When the switch unit 110 is de-activated, the transformer T is stopped charging the storage element. In this embodiment, the switch unit 110 is an N-type transistor Q1. In other embodiments, the switch unit 110 may be a P-type transistor.

The resistor R1 is coupled to the primary coil PR via the node SW. The voltage of the node SW relates to the resistance of the resistor R1. In one embodiment, the resistor R1 is a variable resistor. In this case, since the resistance of the resistor R1 is adjustable, the voltage of the node SW can be adjustable such that the voltage of the output voltage $V_{OUT}$ is adjustable. Assuming that the output voltage $V_{OUT}$ is provided to a strobe. Since the brightness of the strobe relates to the voltage of the output voltage $V_{OUT}$, when the resistance of the variable resistor is adjusted, the brightness of the strobe is also adjusted.

The current detection unit 120 detects the current $I_{R1}$ flowing through the resistor R1. When the current $I_{R1}$ reaches a set current $I_{SET}$, the current detection unit 120 sends a full signal $S_F$ to de-activate the switch unit 110. Taking a conventional voltage detection unit as an example, the conventional voltage detection unit utilizes a voltage divider comprising at least two resistors to detect the voltage of the node SW. However, the current detection unit 120 utilizes a single resistor (e.g. R1) to detect the voltage of the node SW. Therefore, the cost of the elements in the charging circuit 100 is reduced and the usable space of the charging circuit 100 is increased. In addition, since the voltage of the primary coil PR is less than the voltage of the secondary coil SE, when the current detection unit 120 detects the current $I_{R1}$ flowing through the resistor R1, the current detection unit 120 causes a little power consumption.

The present disclosure does not limit the circuit structure of the current detection unit 120. Any circuit can serve as the current detection unit 120, as long as the circuit is capable of detecting current and comparing the current with a set current.

In this embodiment, the current detection unit 120 comprises a transistor Q2, comparing circuits 121 and 122, and a current source 123. The gate of the transistor Q2 is coupled to the output terminal of the comparing circuit 121. The comparing circuit 121 is a voltage comparator. The inverting input of the voltage comparator is coupled to the source of the transistor Q2. The non-inverting input of the voltage comparator receives the battery voltage BAT. The current source 123 provides a set current $I_{SET}$. The comparing circuit 122 is a current comparator. The non-inverting input of the current comparator receives the current $I_{R1}$. The inverting input of the current comparator receives the set current $I_{SET}$. The comparing circuit 122 is configured to generate the full signal $S_F$.

In this embodiment, the charging circuit 100 further comprises a control circuit 130 to de-activate the switch unit 110 according to the full signal $S_F$. As shown in FIG. 1, the control circuit 130 comprises a SR flip-flop 131 and a transmitter 132. The SR flip-flop 131 comprises a set terminal S, a reset terminal R and an output terminal Q. The set terminal S receives an enable signal $S_{EN}$. The reset terminal R receives a disable signal $S_{DS}$. The transmitter 132 is coupled between the output terminal Q and the switch unit 110 and controls the switch unit 110 according to the full signal $S_F$ and a charging signal $S_C$.

In this embodiment, when the current $I_{R1}$ is equal to the set current $I_{SET}$, the transmitter 132 de-activates the switch unit 110. Therefore, the transformer T is stopped charging the storage element C to avoid over-charging the storage element C. After the storage element C is discharged, an external element (not shown) sends a charging signal $S_C$. The transmitter 132 activates the switch unit 110 upon receipt of the charging signal $S_C$, so that the transformer T charges the storage element C again. In one embodiment, when the transmitter 132 de-activates the switch unit 110 according to the full signal $S_F$, the transmitter 132 continually de-activates the switch unit 110 until the transmitter 132 receives the charging signal $S_C$. That is, the transmitter 132 just activates the switch unit 110 upon receipt of the charging signal $S_C$.

In one embodiment, the control unit 130 discontinuously activates the switch unit 110. For example, when the current flowing through the switch unit 110 reaches a disable current $I_{off}$, the control unit 130 de-activates the switch unit 110. Therefore, the voltage of the node SW is gradually reduced. When the voltage of the node SW reaches a pre-determined voltage, the control unit 130 activates the switch unit 110. Therefore, the current flows through the switch unit 110 again. In this embodiment, the pre-determined voltage relates to the resistances of the resistors R2 and R3 of the turn-on unit 140.

As shown in FIG. 1, the charging circuit 100 further comprises the turn-on unit 140. The turn-on unit 140 processes the voltage of the node SW of the primary coil PR to generate a processed result and generates the enable signal $S_{EN}$ according to the processed result. In this embodiment, the turn-on unit 140 subtracts a pre-determined value from the voltage of the node SW and then compares the result of the subtraction with the battery voltage BAT. If the subtractive result is lower than the battery voltage BAT, the turn-on unit 140 generates the enable signal $S_{EN}$ to activate the switch unit 110. Therefore, the time when the switch unit 110 waits the enable signal $S_{EN}$ is shortened.

Furthermore, after the transformer T transforms the energy of the battery voltage BAT to charge the storage element C, the voltage of the node SW is reduced. The turn-on unit 140 processes the voltage of the node SW to generate a processing result and determines whether the processing result is lower than the battery voltage BAT. When the processing result is lower than the battery voltage BAT, the turn-on unit 140 generates the enable signal $S_{EN}$ to activate the switch unit 110. Therefore, the switch unit 110 is speedily activated.

The turn-on unit 140 is not limited to the above-mentioned circuit structure in the present disclosure, and any circuit can be served as a turn-on unit, as long as the circuit is capable of performing the above function. In this embodiment, the turn-on unit 140 comprises resistors R2 and R3, a transistor Q3, a sample-hold circuit S/H, a current source 141 and a comparing circuit 142. The resistor R2 is coupled to the primary coil PR. The sample-hold circuit S/H detects the current flowing through the resistor R2 to generate a detection result $S_{DT}$. The current source 141 generates an enable current $I_{on}$ according the detection result $S_{DT}$. The resistor R3 is coupled to the primary coil PR and is coupled to the current source 141 at the node 143. The comparing circuit 142 compares the voltage of the node 143 and the battery voltage BAT to generate an enable signal $S_{EN}$.

In this embodiment, the sample-hold circuit S/H utilizes the detection result $S_{DT}$ to make the current IL generated by the current source 141 equal to the current flowing through the resistor R2. Therefore, the current flowing through the resistor R3 equals to the current $I_{R2}$ flowing through the resistor R2. The voltage $V_{143}$ of the node 143 is expressed by the following equation:

$$V_{143} = V_{SW} - V_{R3}$$

$$= V_{SW} - \left(\frac{V_{SW} - BAT}{R2}\right) \times R3$$

When the voltage $V_{143}$ of the node 143 is less than the battery voltage BAT, the turn-on unit 141 sends the enable signal $S_{EN}$. The control unit 130 activates the switch unit 110 according to the enable signal $S_{EN}$. In one embodiment, the battery voltage BAT is provided by a battery (not shown). The battery may be coupled to the primary coil PR. Furthermore, in this embodiment, the resistance of the resistor R2 is greater than the resistance of the resistor R3, but the present disclosure is not limited thereto. In one embodiment, the resistances of the resistors R2 and R3 are designed according to the currents flowing through the resistors R2 and R3. In other embodiments, the sample-hold circuit S/H utilizes the detection result $S_{DT}$ to make the enable current $I_{on}$ generated by the current source 141 proportional to the current $I_{R2}$ flowing through the resistor R2.

In this embodiment, the charging circuit 100 further comprises a turn-off unit 150. The turn-off unit 150 generates a disable signal $S_{DS}$ according to the current flowing through the switch unit 110 to de-activate the switch unit 110. As shown in FIG. 1, the turn-off unit 150 comprises a comparing circuit 151 and a current source 152. When the switch unit 110 is activated, the current $I_{110}$ flowing through the switch unit 110 is gradually increased. When the current $I_{110}$ flowing through the switch unit 110 is greater than the disable current $I_{off}$, the comparing circuit 151 sends a disable signal $S_{DS}$. The control unit 130 de-activates the switch unit 110 according to the disable signal $S_{DS}$.

The switch unit 110 is activated and de-activated many times to charge the storage element C. Additionally, the current flowing through the primary coil PR controls the switch unit 110 to avoid over-charging the storage element C. In some embodiments, the charging circuit 100 is integrated into a control chip, as shown in FIG. 2.

Figure 2:
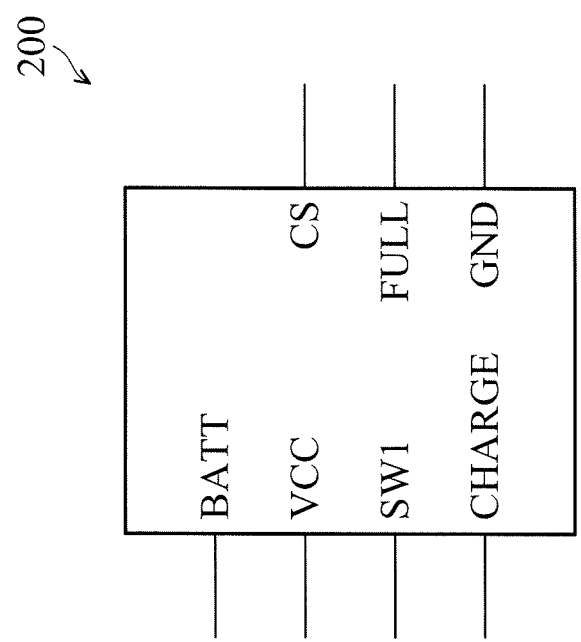
FIG. 2 is a schematic diagram of an exemplary embodiment of a control chip, in accordance with an embodiment of present disclosure.

Referring to FIG. 2, the control chip 200 comprises a battery pin BATT, power pins VCC and GND, a node pin SW1, a charging pin CHARGE, a full pin FULL and a set pin CS. The battery pin BATT is coupled to an external battery (not shown) and receives the battery voltage BAT provided by the external battery. The power pin VCC receives a high operation voltage to supply power to the charging circuit 100 shown in FIG. 1. The power pin GND receives a low operation voltage to supply power to the charging circuit 100 shown in FIG. 1. The node pin SW1 outputs the voltage of the node SW of the primary coil PR. The charging pin CHARGE receives a charging signal $S_C$. The control unit 130 activates the switch unit 110 according to the charging signal $S_C$. The full pin FULL outputs the full signal $S_F$. The set pin CS is configured to receive at least one set signal. In this embodiment, the set signal is the disable current $I_{off}$ or the set current $I_{SET}$.

Figure 3:
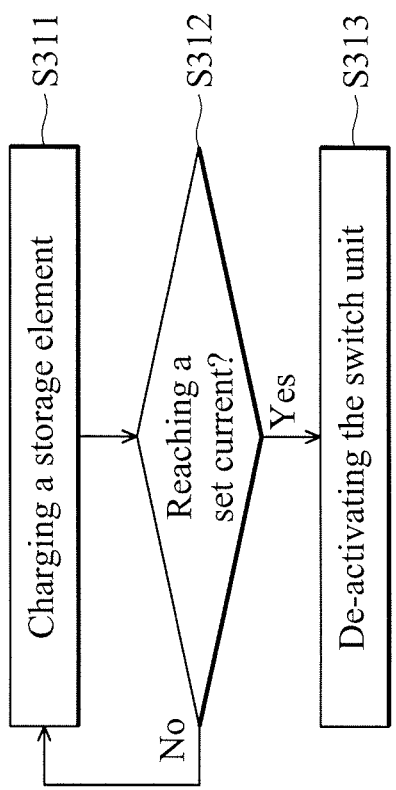
FIGS. 3 and 4 are flowcharts of exemplary embodiments of a control method, in accordance with some embodiments.

FIG. 3 is a schematic diagram of an exemplary embodiment of a control method, in accordance with some embodiments. First, in step S311 a transformer is utilized to charge a storage element. In this embodiment, a switch unit is coupled to the primary coil of the transformer, and the storage element is coupled to the secondary coil of the transformer. In one embodiment, the transformer charges the storage element according to a battery voltage.

In step S312, it is determined whether the current flowing through the primary coil reaches a set current. In step S313, when the current flowing through the primary coil reaches the set current, the switch unit is de-activated. In this embodiment, when the current flowing through the primary coil reaches the set current, it means that the voltage stored in the storage element reaches a maximum level such that the switch unit is de-activated to stop charging the storage element. However, when the current flowing through the primary coil does not reach the set current, the step S311 is executed to continuously charge the storage element.

Figure 4:
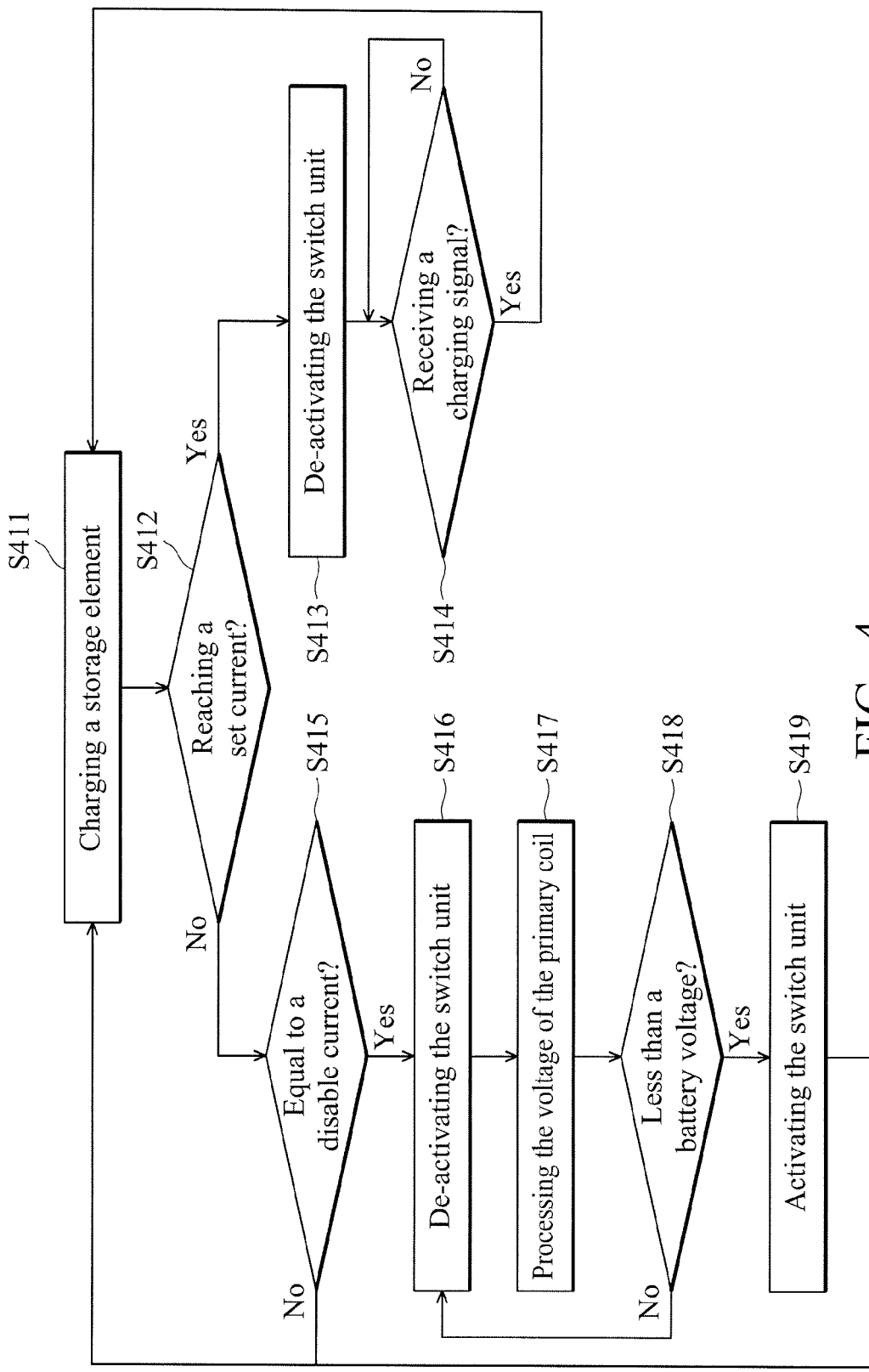

FIG. 4 is a schematic diagram of another exemplary embodiment of the control method, in accordance with some embodiments. First, in step S411 a transformer is utilized to charge a storage element. Since the operation of step S411 is the same as the operation of step S311, the detailed description of step S411 is omitted. In step S412, it is determined whether the current flowing through the primary coil reaches a set current. In step S413, when the current flowing through the primary coil reaches the set current, the switch unit is de-activated to stop charging the storage element. Then, in step S414 it is determined whether a charging signal is received. If a charging signal is received, the step S411 is executed to charge the storage element again. If no charging signal is received, the step S414 is executed.

In the step S412, when the current flowing through the primary coil does not reach the set current, it is determined whether the current flowing through the primary coil is equal to a disable current, in the step S415. While the storage element is charged, when the current flowing through the primary coil is equal to the disable current, the switch unit is de-activated, in the step S416. When the current flowing through the primary coil is not equal to the disable current, the step S411 is executed.

After the switch unit is de-activated, the voltage of the primary coil is processed to generate a processed result (step S417). Then, it is determined whether the processed result is less than a battery voltage (step S418). When the processed result is less than the battery voltage, the switch unit is activated (step S419) and then the step S411 is executed. When the processed result is not less than a battery voltage, the step S416 is executed. In one embodiment, the battery voltage is generated by a battery. The battery is coupled to the primary coil of the transformer.

In one embodiment, the result of the step S417 is generated by subtracting a pre-determined voltage from the voltage of the primary coil, such that the storage element is charged and the voltage stored in the storage element is a maximum value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the present disclosure has been described by way of example and in terms of the preferred embodiments, it is to be understood that the present disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charging circuit, comprising:
   a transformer comprising a primary coil and a secondary coil;
   a storage element coupled to the secondary coil;
   a switch coupled to the primary coil;
   a first resistor directly connected to the primary coil;
   a current detection circuit detecting a current flowing through the first resistor, wherein when the current reaches a set current, the current detection circuit sends a full signal to de-activate the switch; and
   a control unit configured to de-activate the switch according to the full signal, wherein when the control unit receives a charging signal, the control unit activates the switch,
   wherein the control unit comprises:
      an SR flip-flop comprising a set terminal receiving an enable signal, a reset terminal receiving a disable signal, and an output terminal; and
      a transmitter coupled between the output terminal and the switch and controlling the switch according to the full signal and the charging signal.

2. The charging circuit as claimed in claim 1, further comprising:
   a turn-off unit sending a disable signal according to a current flowing through the switch to disable the switch.

3. The charging circuit as claimed in claim 2, wherein the turn-off unit comprises:

a comparing circuit comparing the current flowing through the switch with a disable current to generate the disable signal.

4. The charging circuit as claimed in claim 1, wherein the first resistor is a variable resistor.

5. A charging circuit, comprising:
a transformer comprising a primary coil and a secondary coil;
a storage element coupled to the secondary coil;
a switch coupled to the primary coil;
a first resistor directly connected to the primary coil;
a current detection circuit detecting a current flowing through the first resistor, wherein when the current reaches a set current, the current detection circuit sends a full signal to de-activate the switch; and
a turn-on unit processing a voltage of the primary coil to generate a processed result and sending an enable signal according to the processed result to activate the switch,
wherein the turn-on unit comprises:
a second resistor coupled to the primary coil;
a sample-hold circuit detecting the current flowing through the second resistor to generate a detection result;
a current source generating an enable current according to the detection result;
a third resistor coupled to the primary coil and coupled to the current source at a node; and
a comparing circuit comparing a voltage of the node with a battery voltage provided by a battery coupled to the primary coil to generate the enable signal.

6. A control chip comprising:
a full pin providing a full signal;
a first power pin receiving a first operation voltage;
a second power pin receiving a second operation voltage; and
a charging circuit operating according to the first and second operation voltages and comprising:
a transformer comprising a primary coil and a secondary coil;
a storage element coupled to the secondary coil;
a switch coupled to the primary coil;
a first resistor directly connected to the primary coil; and
a current detection circuit detecting a current flowing through the first resistor, wherein when the current reaches a set current, the current detection circuit sends the full signal and de-activates the switch,
wherein the charging circuit further comprises:
a control unit de-activating the switch according to the full signal; and
a charging pin receiving a charging signal, wherein the control unit activates the switch according to the charging signal,
wherein the control unit comprises:
a SR flip-flop comprising a set terminal receiving an enable signal, a reset terminal receiving a disable signal and an output terminal; and
a transmitter coupled between the output terminal and the switch and controlling the switch according to the full signal and the charging signal.

7. The control chip as claimed in claim 6, wherein the charging circuit further comprises:
a turn-on unit processing a voltage of the primary coil to generate a processed result and sending an enable signal according to the processed result to activate the switch, wherein the turn-on unit comprises:
a second resistor coupled to the primary coil;
a sample-hold circuit detecting the current flowing through the second resistor to generate a detection result;
a current source generating an enable current according to the detection result;
a third resistor coupled to the primary coil and coupled to the current source at a node; and
a comparing circuit comparing a voltage of the node with a battery voltage to generate the enable signal.

8. The control chip as claimed in claim 7, further comprising:
a battery pin receiving a battery voltage provided by a battery coupled to the primary coil, wherein the turn-on unit generates the enable signal according to the processed result and the battery voltage.

9. The control chip as claimed in claim 6, wherein the charging circuit further comprises:
a turn-off unit sending a disable signal according to a current flowing through the switch to disable the switch.

10. The control chip as claimed in claim 9, wherein the turn-off unit comprises:
a comparing circuit comparing the current flowing through the switch and the disable current to generate the disable current.

11. The control chip as claimed in claim 6, further comprising:
a set pin receiving a set signal, wherein the set signal means a disable current.

* * * * *